Figure 1:
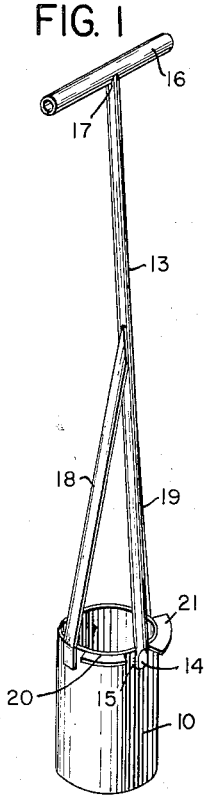

March 20, 1962 J. V. WARREN 3,025,636
PLANT CANNING OR POTTING
Filed April 14, 1961

INVENTOR
J. V. WARREN

BY
ATTORNEY

United States Patent Office 3,025,636
Patented Mar. 20, 1962

3,025,636
PLANT CANNING OR POTTING
James V. Warren, Rte. 1, Box 54, Sanford, Fla.
Filed Apr. 14, 1961, Ser. No. 103,697
2 Claims. (Cl. 47—37)

This invention relates to the growth, cultivation, and care of plants of various kinds, to the movement of such plants from one location, such as, for example, from that where they are grown to another location at which they are cultivated, or put on display, or offered for sale.

The invention relates particularly to the transplanting of plants of various kinds and to the method and equipment by which such transplanting may be accomplished from the place of growth to the location where they are on display.

It is well known that a large percentage of all the plants and shrubs sold in nurseries and the like either are container grown, which is expensive, or they are taken from the ground with bare roots and packed by hand, which is a slow and expensive procedure, and in which the plants suffer severe root shock. As is well known, it is difficult to grow shrubs and plants in containers where a long period of time is necessary for their growth to the desired size due to the plants or shrubs becoming root bound or stunted long before they reach the desired stage of development and in which the containers rust and require replacement.

It is an object of the invention to provide transplanting equipment by means of which plants, shrubs or the like may be taken from the ground and transplanted in containers in a single, simple operation to simulate container-grown plants and shrubs.

Another object of the invention is to provide means by which a plant, shrub or the like may be easily and quickly transferred from the earth to containers with a minimum of effort and in a minimum of time with least disturbance to the plant and thereby producing a more uniform and improved product.

A further object of the invention is to provide for transferring plants, including planter equipment, by which the fronds or foliage of the plants can be contracted and a wrapper applied about them to hold them in such contracted position to allow a transplanter to be applied thereon while they are growing in the ground and thereafter the transplanter moved downwardly and then swung from a vertical to a horizontal position without disturbing the root structure, and in the event earth is not retained around the roots of the plant, necessary earth can be readily replaced by hand, the transplanter returned to its vertical position and then upwardly withdrawn to leave the plant in its container where it simulates growth in such container.

A further object of the invention is to provide apparatus by which a plant may be grown in the earth until it is ready for sale, and by means of a very simple operation can be extracted from the ground, inserted into a container in substantially a single operation with no visible signs of root shock, and without interfering with the growth of the plant.

Figure 2:
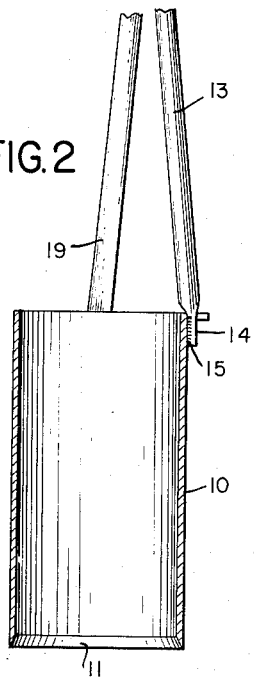
Figure 3:
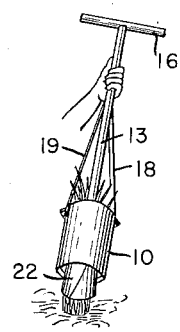
Figure 4:
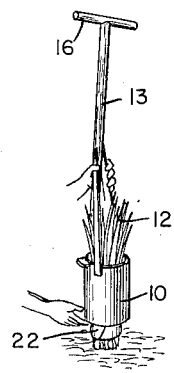
Figure 5:
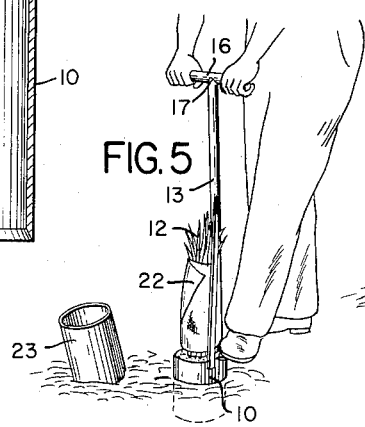
Figure 6:
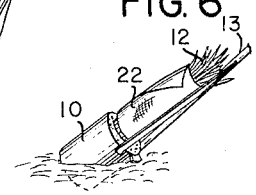
Figure 7:
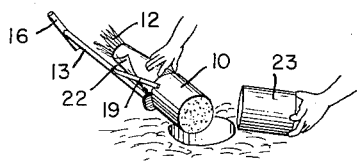
Figure 8:
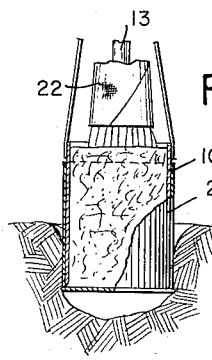
Figure 9:
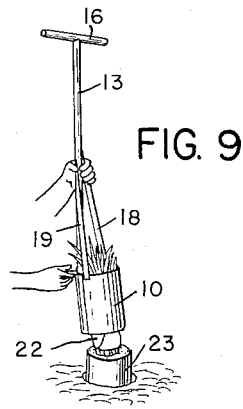

Other objects and advantages of the invention will be apparent from the following description taken in conjunction with the accompanying drawing wherein:

FIG. 1 is a perspective illustrating one application of the invention;

FIG. 2, an enlarged longitudinal section through the cylinder of FIG. 1;

FIGS. 3 through 7, perspective views illustrating the application and use of the plant canning or potting device;

FIG. 8, a vertical section through the device with the plant inside;

FIG. 9, a perspective view illustrating the transplanting operation; and

Figure 10:
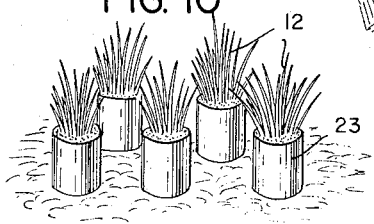

FIG. 10, a perspective of plants which have been placed in cans or pots.

Briefly stated, the invention is directed to the transfer of a plant, shrub, or the like, with an accompanying undisturbed mass of earth about the roots of the same, from a place of growth, into a can, pot or other container, by an apparatus comprising a sleeve of uniform diameter throughout its length and adapted to be placed over the foliage and forced into the earth to encompass a mass of the latter and the roots of the plant or shrub, and with such sleeve providing an unobstructed passage of a length and breadth to accommodate the size of the plant and the main portion of the root structure, the sleeve having laterally extending shelf means which can be engaged by the foot and pressure applied to force the sleeve into the earth. Also, a shaft is attached length-wise to the sleeve in a manner to offer minimum obstruction to passage through the sleeve to the foliage of a plant, such handle being provided with a cross member at its end remote from the sleeve to provide a hand hold, and the handle may also have a brace at each side of the same.

With continued reference to the drawing, the plant canner or potting apparatus of the present invention comprises an open sleeve or cylinder 10 having a sharp lower end 11 in order that it may be readily forced into the earth about a plant 12 to be received within the sleeve or cylinder after the latter is forced its full length into the earth.

A handle is provided for the sleeve or cylinder 10, such handle comprising a shaft 13 having a flattened end 14 secured by welding 15 or other desired means to the upper end of the sleeve 10. A hand grip 16 is secured by any desired means, as for example by welding 17 across the upper end of the handle, and the shaft 13 is reinforced by a pair of braces 18 and 19, one on each side of the shaft 13, with the arrangement being such that the shaft is inclined inwardly toward the axis of the cylinder and it together with the braces forms a cradle-like structure for aiding in supporting or protecting the foliage and any wrapper placed around the foliage during various phases of the transplanting operation.

The sleeve or cylinder 10 is unobstructed, so that it can be applied over the constricted fronds of a palm or the foliage of another plant, and in order to provide an adequate area for engagement by the foot of an operator and by which the sleeve or cylinder may be forced into the earth, a pair of ears or foot pieces 20 and 21 are welded or otherwise attached at right angles to the upper end of the cylinder.

In the use of the device, the plant 12 to be canned or potted is first wrapped with stiff canvas 22 of an appropriate size to bring the foliage together to allow the sleeve or cylinder 10 to be applied over the plant 12. Then foot pressure is applied to one of the foot pieces on the upper edge of the cylinder 10 to force the latter into the earth to the desired depth. After this has been done, the cylinder is oscillated to loosen it sufficiently to permit it to be moved onto its side from a vertical to a horizontal position. Next the roots of the plant are inspected, and if appreciable earth has been dislodged this earth is replaced by hand. Thereafter a can or pot 23 is applied over the outside of the cylinder and is stood vertically whereupon upward pressure applied to the foot piece at the upper edge of the container or to the handle will permit the cylinder 10 to be moved by a vibrating pull, thus removing the transplanter from the container.

In the manner indicated, the growing plant or shrub may be removed with a body of earth and put into a can to simulate a container-grown plant with minimum of effort and a minimum of time and without disturbing the

What is claimed is:

1. Apparatus for transferring a plant with an accompanying undisturbed mass of earth from a place of growth to a container, said apparatus comprising:

an open-ended cylinder of uniform diameter, sharpened at one end, having a continuous cylindrical wall and of a length and diameter proportionate to the mass of earth necessary to be moved with the root structure of the plant therein, a handle comprising a single shaft rigidly attached to the upper end of the cylinder and extending upwardly and inwardly at a slight angle toward the axis of the cylinder so as to offer minimum obstruction to the application of said cylinder over a plant, a pair of braces, one at each side of said shaft, extending from the shaft to the cylinder and fixed to the cylinder at substantially diametrically opposed positions substantially equi-distant from said shaft, and a pair of laterally extending ears secured to the top of the cylinder, one on each side of said shaft and between the shaft and the corresponding bracing member.

2. The method of transplanting a plant which comprises:

wrapping the foliage of the plant into an upstanding bundle of reduced size, applying over said bundled foliage an open-ended cylinder having a continuous cylindrical wall of a length and diameter proportionate to the mass of earth necessary to be moved with the root structure of the plant therein, forcing said cylinder into the earth about the roots of the plant to separate the earth encompassing the roots from the adjacent surrounding earth, removing the cylinder with the contained earth and root system from the ground and swinging it to a substantially horizontal position, placing a container around the cylinder with a snug fit, and removing the cylinder from the container by an upward pull, thus leaving the plant with its surrounding earth undisturbed in the container.

References Cited in the file of this patent

UNITED STATES PATENTS

| | | |
|---|---|---|
| 522,039 | Baldridge | June 26, 1894 |
| 536,895 | Richards | Apr. 2, 1895 |
| 1,129,924 | Von Hassel | Mar. 2, 1915 |
| 1,783,026 | Ober | Nov. 25, 1930 |
| 1,988,886 | Wilson | Jan. 22, 1935 |
| 2,599,087 | Benison | June 3, 1952 |
| 2,934,204 | Pardee | Apr. 26, 1960 |